(12) United States Patent
Iwatsuka et al.

(10) Patent No.: US 12,174,510 B2
(45) Date of Patent: Dec. 24, 2024

(54) OPTICAL MODULATION ELEMENT

(71) Applicant: TDK Corporation, Tokyo (JP)

(72) Inventors: Shinji Iwatsuka, Tokyo (JP); Kenji Endou, Tokyo (JP); Hiroki Hara, Tokyo (JP)

(73) Assignee: TDK Corporation, Tokyo (JP)

( * ) Notice: Subject to any disclaimer, the term of this patent is extended or adjusted under 35 U.S.C. 154(b) by 195 days.

(21) Appl. No.: 17/797,199

(22) PCT Filed: Jan. 20, 2021

(86) PCT No.: PCT/JP2021/001823
§ 371 (c)(1),
(2) Date: Aug. 3, 2022

(87) PCT Pub. No.: WO2021/161745
PCT Pub. Date: Aug. 19, 2021

(65) Prior Publication Data
US 2023/0059850 A1 Feb. 23, 2023

(30) Foreign Application Priority Data
Feb. 10, 2020 (JP) .................................. 2020-020814

(51) Int. Cl.
G02F 1/225 (2006.01)
G02F 1/035 (2006.01)
G02F 1/21 (2006.01)

(52) U.S. Cl.
CPC .............. *G02F 1/225* (2013.01); *G02F 1/035* (2013.01); *G02F 1/212* (2021.01); *G02F 2201/12* (2013.01)

(58) Field of Classification Search
CPC .......... G02F 1/212; G02F 1/0356; G02F 1/03; G02F 1/025; G02F 1/035; G02F 1/225; G02F 1/0316; G02F 1/011
See application file for complete search history.

(56) References Cited

U.S. PATENT DOCUMENTS

| 2005/0175271 A1 | 8/2005 | Sugiyama et al. |
| 2012/0087614 A1 | 4/2012 | Ishimura et al. |
| 2019/0146302 A1* | 5/2019 | Iwatsuka ................. G02F 1/035 385/2 |

FOREIGN PATENT DOCUMENTS

| JP | 2005-221874 A | 8/2005 |
| JP | 2006-195383 A | 7/2006 |

(Continued)

OTHER PUBLICATIONS

International Search Report issued in corresponding International Patent Application No. PCT/JP2021/001823, dated Apr. 20, 2021, with English translation.

*Primary Examiner* — Ryan A Lepisto
*Assistant Examiner* — Erin D Chiem
(74) *Attorney, Agent, or Firm* — Rimon P.C.

(57) ABSTRACT

To provide an optical modulation element capable of suppressing electrode loss at a low frequency of 50 GHz or less, and suppressing radiation loss at a high frequency of 50 GHz or more. An optical modulation element comprises: a substrate; and at least one interaction part provided on the substrate. The interaction part includes: first and second optical waveguides formed adjacent to each other on the substrate; and first and second signal electrodes provided so as to oppose the first and second optical waveguides respectively. o ground electrode is provided in a nearby region of the interaction part, and a ground electrode is provided in the vicinity of at least one of an input part and a terminal part electrically connected to each of the first and second signal electrodes.

28 Claims, 12 Drawing Sheets

(56) References Cited

FOREIGN PATENT DOCUMENTS

| JP | 2014-006348 A | 1/2014 |
| JP | 2012-078759 A | 4/2014 |
| JP | 2015-014715 A | 1/2015 |
| JP | 2019174619 A | * 10/2019 |

* cited by examiner

OPTICAL MODULATION ELEMENT

CROSS REFERENCE TO RELATED APPLICATIONS

This application is the U.S. National Phase under 35 U.S.C. § 371 of International Application No. PCT/JP2021/001823, filed on Jan. 20, 2021, which claims the benefit of Japanese Patent Application No. 2020-020814, filed on Feb. 10, 2020, the entire contents of each are hereby incorporated by reference.

TECHNICAL FIELD

The present invention relates to an optical modulation element, more particularly, to an electrode structure of a Mach-Zehnder optical modulation element.

BACKGROUND ART

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

The optical modulator is one of the typical electro-optical devices, and a Mach-Zehnder optical modulator in which an optical waveguide is formed by Ti (titanium) diffusion in the vicinity of the surface of a lithium niobate single-crystal substrate has been put to practical use (refer to, for example, a Patent Document 1). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

On the other hand, Patent Documents 2 and 3 disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

FIG. 12A illustrates the sectional structure of a conventional optical modulation element 20A described in Patent Document 2. A pair of optical waveguides 22a and 22b of a lithium niobate film are formed on a sapphire substrate 21, and a signal electrode 24a and a ground electrode 24b are disposed respectively above the optical waveguides 22a and 22b through a buffer layer 23. The thus configured optical modulation element 20A is of a so-called single-drive type having one signal electrode 24a. The signal electrode 24a and ground electrode 24b have a symmetrical structure, so that electric fields to be applied to the optical waveguides 22a and 22b are the same in magnitude and opposite in polarity, preventing the wavelength chirp of a modulated light from occurring.

However, the area of the ground electrode 24b is small, preventing operation at high frequencies.

FIG. 12B illustrates a conventional optical modulation element 20B described in Patent Document 3. Two signal electrodes $24a_1$ and $24a_2$ are disposed above a pair of optical waveguides 22a and 22b of a lithium niobate film, respectively, through a buffer layer 23, and three ground electrodes 24c, 24d and 24e are disposed so as to be separated from the signal electrodes $24a_1$ and $24a_2$. When voltages same in magnitude and opposite in polarity are applied to the two signal electrodes $24a_1$ and $24a_2$, respectively, the electric fields to be applied to the optical waveguides 22a and 22b become the same in magnitude and opposite in polarity, thus preventing the wavelength chirp of a modulated light from occurring. Further, the amount of the chirp can be controlled by adjusting voltage to be applied to the pair of optical waveguides 22a and 22b. Furthermore, a sufficient area is ensured for the left and right ground electrodes 24c and 24d, allowing operation at high frequencies. However, the optical modulation element 20B is of a dual drive type having two signal electrodes $24a_1$ and $24a_2$, complicating an electrode structure.

CITATION LIST

Patent Document

[Patent Document 1] Japanese Patent No. 4,485,218
[Patent Document 2] Japanese patent application Laid-open No. 2006-195383
[Patent Document 3] Japanese patent application laid-open No. 2014-006348

DISCLOSURE OF THE INVENTION

Problem to be Solved by the Invention

In optical modulation elements, for a higher transmission rate from the current 32 Gbaud up to 64 Gbaud, a broader bandwidth of 35 GHz or more is required, and to further increase a transmission rate up to 96 Gbaud, bandwidth needs to be 50 GHz or more. In order to achieve such a broad band, the following three points are important: (1) reduction in electrode loss at high frequencies; (2) velocity matching between light and microwave; and (3) impedance matching. Of these, (1) is of particularly significance, because current flows only in the vicinity of the surface of an electrode at high frequencies due to skin effect and electrode loss increases.

To reduce the electrode loss in the conventional optical modulation element 20B illustrated in FIG. 12B, it is effective to increase the cross-sectional area of the signal electrode. Thus, a thickness T or a width W of the signal electrodes $24a_1$ and $24a_2$ needs to be increased.

However, the increase in the thickness T of the signal electrodes $24a_1$ and $24a_2$ reduces the effective dielectric constant of microwave to make the velocity matching unable to be achieved and reduces impedance to make the impedance matching unable to be accomplished. On the other hand, the increase in the width W of the signal electrodes $24a_1$ and $24a_2$ does not change the effective dielectric constant of microwave and impedance significantly, but deteriorates the efficiency of an electric field to be applied to the optical waveguide and disadvantageously increase a half-wavelength voltage. This makes it difficult for the conventional electrode structure to achieve a broad band of 35 GHz or more supporting a higher transmission rate of 64 Gbaud. In particular, in high-speed communication exceeding 64 Gbaud, an abrupt increase in radiation loss at a high frequency of 50 GHz or more causes problems.

Further, when a plurality of optical waveguides are arranged in parallel to constitute an optical waveguide array for miniaturization or multiplexing of an optical modulation element, the distance between optical waveguides of adjacent channels becomes small to increase a ripple in EO properties or crosstalk noise to make high-frequency characteristics more likely to be deteriorated.

It is therefore an object of the present invention to provide an optical modulation element capable of suppressing radiation loss at a high frequency of 50 GHz or more while suppressing electrode loss at a low frequency of 50 GHz or less.

Means for Solving the Problem

To solve the above problems, an optical modulation element according to the present invention includes a substrate and at least one interaction part provided on the substrate. The interaction part includes first and second optical waveguides formed adjacent to each other on the substrate and first and second signal electrodes provided so as to oppose the first and second optical waveguides respectively and to which differential signals are applied. No ground electrode is provided in a nearby region of the interaction part, and a ground electrode is provided in the vicinity of at least one of an input part and a terminal part electrically connected to each of the first and second signal electrodes.

According to the present invention, it is possible not only to reduce ripple and crosstalk at a low frequency of 50 GHz or less but also to suppress radiation loss at a high frequency of 50 GHz or more. Thus, there can be provided an optical modulation element capable of achieving high-speed communication exceeding 64 Gbaud.

In the present invention, the input part preferably has first and second signal electrode pads, and the ground electrode preferably includes a first ground electrode pad adjacent to the first signal electrode pad and a second ground electrode pad adjacent to the second signal electrode pad. With this configuration, it is possible to reduce radiation loss and leakage loss at the input part side of the first and second signal electrodes.

In the present invention, the first and second ground electrode pads are preferably electrically connected to each other. In this case, the first and second ground electrode pads may be electrically connected through a first short-circuit pattern provided on the substrate or through a ground line in a driver circuit that applies the differential signals to the first and second signal electrode pads. This can further stabilize a reference potential on the input part side of the first and second signal electrodes to thereby achieve an optical modulation element having improved high-frequency characteristics.

In the present invention, the terminal part preferably has first and second terminal electrode pads, and the ground electrode preferably includes a third ground electrode pad adjacent to the first terminal electrode pad and a fourth ground electrode pad adjacent to the second terminal electrode pad. With this configuration, it is possible to reduce radiation loss and leakage loss at the terminal part side of the first and second signal electrodes.

In the present invention, the third and fourth ground electrode pads may be electrically connected to each other through a second short-circuit pattern formed on the substrate or through a ground line in a terminator connected to the first and second terminal electrode pads. Further, the third ground electrode pad may be connected to the first ground electrode pad through a third short-circuit pattern formed on the substrate, and the fourth ground electrode pad may be connected to the second ground electrode pad through a fourth short-circuit pattern formed on the substrate. This can further stabilize a reference potential on the terminal part side of the first and second signal electrodes to thereby achieve an optical modulation element having improved high-frequency characteristics.

In the present invention, the nearby region of the interaction part is preferably a region within a range of five times or less an interval between the first and second optical waveguides from the center of the interaction part. When no ground electrode is provided in the thus-defined nearby region, ripple and crosstalk noise can be suppressed at a low frequency of 50 GHz or less.

In the present invention, the substrate is preferably a single crystal substrate, and the first and second optical waveguides are preferably formed of a lithium niobate film formed in a ridge shape on the substrate. Further, the interaction part preferably includes: a waveguide layer including the first and second optical waveguides and formed on a main surface of the substrate; a buffer layer formed on at least the upper surfaces of the respective first and second optical waveguides; and an electrode layer including the first and second signal electrodes and formed on the upper surface of the buffer layer, and the first and second signal electrodes are preferably opposite to the respective first and second optical waveguides through the buffer layer. With this configuration, an optical modulation element having a reduced size and improved high-frequency characteristics can be achieved.

Advantageous Effects of the Invention

According to the present invention, there can be provided an optical modulation element capable of suppressing radiation loss at a high frequency of 50 GHz or more while suppressing electrode loss at a low frequency of 50 GHz or less.

BRIEF DESCRIPTION OF THE DRAWINGS

FIGS. 1A and 1B are schematic plan views illustrating an optical modulation element according to a first embodiment of the present invention, in which FIG. 1A illustrates only an optical waveguide, and FIG. 1B illustrates the entire configuration of the optical modulating element including a traveling-wave electrode.

MODE FOR CARRYING OUT THE INVENTION

Preferred embodiments of the present invention will be described below with reference to the accompanying drawings.

Figure 1A:
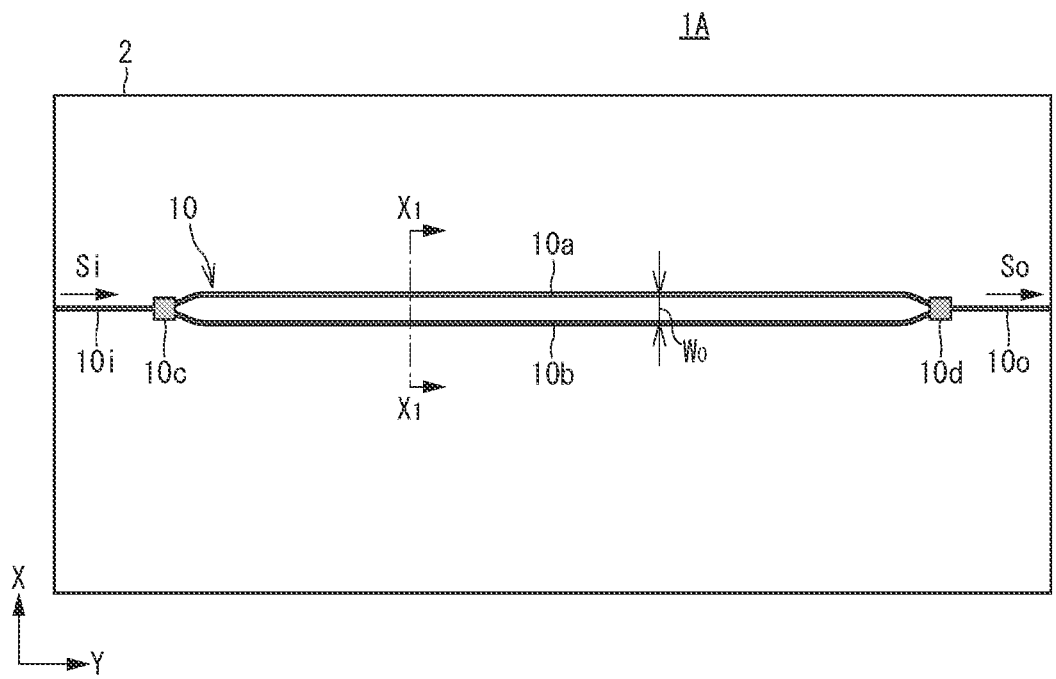
Figure 1B:
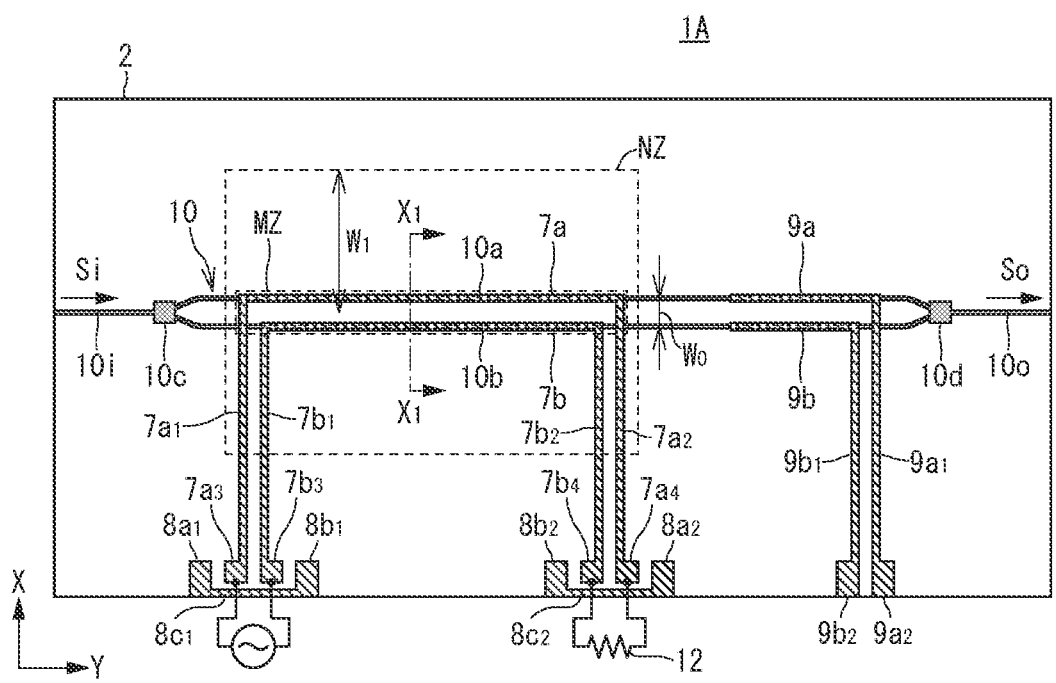

FIGS. 1A and 1B are schematic plan views illustrating an optical modulation element according to a first embodiment of the present invention. FIG. 1A illustrates only an optical waveguide, and FIG. 1B illustrates the entire configuration of the optical modulating element including a traveling-wave electrode.

As illustrated in FIGS. 1A and 1B, an optical modulation element 1A includes a Mach-Zehnder optical waveguide 10 formed on a substrate 2 and having first and second optical waveguides 10a and 10b provided in parallel to each other, a first signal electrode 7a provided along the first optical waveguide 10a, a second signal electrode 7b provided along the second optical waveguide 10b, a first bias electrode 9a provided along the first optical waveguide 10a, and a second bias electrode 9b provided along the second optical waveguide 10b. The first and second signal electrodes 7a and 7b constitute an interaction part MZ of the Mach-Zehnder optical modulation element together with the first and second optical waveguides 10a and 10b.

The Mach-Zehnder optical waveguide 10 is an optical waveguide having a Mach-Zehnder interferometer structure. The Mach-Zehnder optical waveguide 10 has the first and second optical waveguides 10a and 10b which are branched from a single input waveguide 10i at a demultiplexer 10c and merged into a single output waveguide 10o at a multiplexer 10d. Input light Si is demultiplexed at the demultiplexer 10c. The demultiplexed signals travel through the first and second optical waveguides 10a and 10b, respectively, and multiplexed at the multiplexer 10d. The multiplexed signal is then output from the output waveguide 10o as a modulation signal So.

The first and second signal electrodes 7a and 7b are linear electrode patterns overlapping the first and second optical waveguides 10a and 10b, respectively, in a plan view. Both ends of each of the first and second signal electrodes 7a and 7b are drawn to the vicinity of the outer peripheral end of the substrate 2. More specifically, one ends of the first and second signal electrodes 7a and 7b are drawn to the vicinity of the edge of the substrate 2 through lead-out parts $7a_1$ and $7b_1$ and electrically connected to first and second signal electrode pads $7a_3$ and $7b_3$ provided in the vicinity of the edge of the substrate 2. The other ends of the first and second signal electrodes 7a and 7b are drawn to the vicinity of the edge of the substrate 2 through lead-out parts $7a_2$ and $7b_2$ and electrically connected to first and second terminal electrode pads $7a_4$ and $7b_4$ provided in the vicinity of the edge of the substrate 2.

The first and second signal electrode pads $7a_3$ and $7b_3$ at the one ends of the first and second signal electrodes 7a and 7b each serve as a signal input terminal and is connected to a driver circuit. The first and second terminal electrode pads $7a_4$ and $7b_4$ at the other ends of the first and second signal electrodes 7a and 7b are connected to each other through a terminal resistor 12. As a result, the first and second signal electrodes 7a and 7b function as a differential coplanar traveling-wave electrode.

The first and second bias electrodes 9a and 9b are provided independently of the first and second signal electrodes 7a and 7b, respectively, so as to apply DC voltage (DC bias) to the first and second optical waveguides 10a and 10b. One ends $9a_1$ and $9b_1$ of the first and second bias electrodes 9a and 9b are each an input terminal of the DC bias. Although, in the present embodiment, the first and second bias electrodes 9a and 9b are positioned closer to the output terminal side of the Mach-Zehnder optical waveguide 10 than the first and second signal electrodes 7a and 7b, they may be positioned closer to the input terminal side. Further, the first and second bias electrodes 9a and 9b may be omitted, and instead, a modulated signal including superimposed DC bias may be input to the first and second signal electrodes 7a and 7b.

Differential signals (modulated signals) having the same absolute value but opposite polarities are input to the first and second signal electrode pads $7a_3$ and $7b_3$. The first and second optical waveguides 10a and 10b are each formed of a material, such as lithium niobate, having electrooptic effect, so that the refractive indices of the first and second optical waveguides 10a and 10b are changed with +Δn and −Δn by an electric field applied to the first and second optical waveguides 10a and 10b, with the result that a phase difference between the pair of optical waveguides is changed. A signal light modulated by the change in the phase difference is output from the output waveguide 10o.

As described above, the optical modulation element 1A according to the present embodiment is of a dual drive type constituted by the pair of signal electrodes, so that it is possible to increase the symmetry of an electric field to be applied to the pair of optical waveguides to thereby reduce the wavelength chirp.

In the present embodiment, no ground electrode is provided in a nearby region NZ of the interaction part MZ. The nearby region NZ of the interaction part MZ is defined as a region within a range of five times or less ($W_1 \leq 5W_0$) an interval $W_0$ between the first and second optical waveguides 10a and 10b spanning in the left and right direction from the center of the interaction part MZ in the width direction thereof. The ground electrode refers to an electrode serving as an electric potential reference point.

Figure 12A:
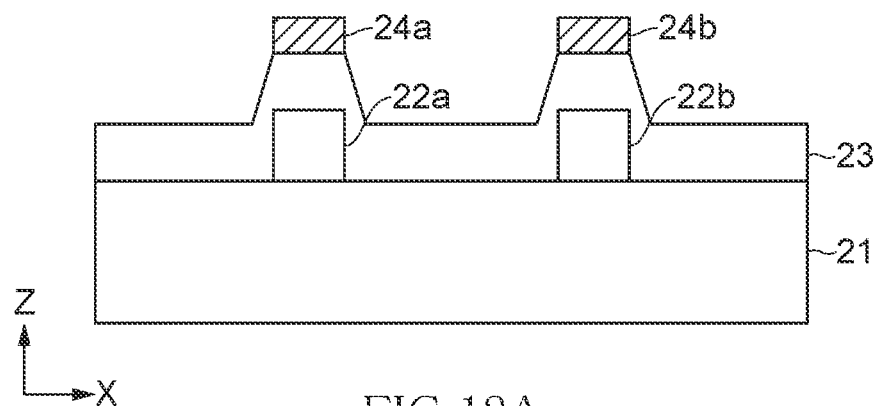
FIGS. 12A and 12B are schematic cross-sectional view illustrating a structure of a conventional optical modulation element.
Figure 12B:
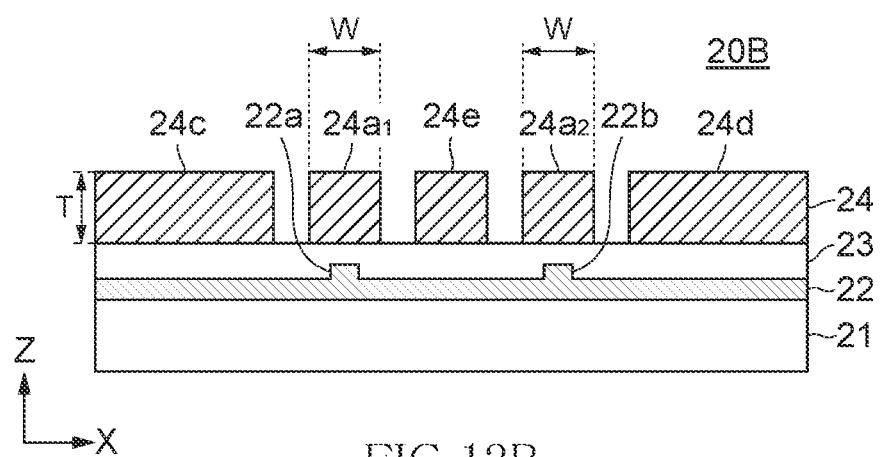

The ground electrode is typically provided in the vicinity of the first and second signal electrodes 7a and 7b constituting the interaction part MZ (see FIG. 12B, etc.). However, it becomes difficult to ensure a sufficient width or area for the ground electrode due to miniaturization of an optical modulation element, and a ground electrode having an insufficient size may deteriorate high-frequency characteristics. However, in the present embodiment, the ground electrode is omitted from the nearby region NZ of the interaction part MZ, so that high-frequency characteristics do not deteriorate even with the miniaturization, and the interaction part MZ can be easily multiplexed.

For descriptive convenience, in FIG. 1, the interval $W_0$ between the first and second optical waveguides 10a and 10b is sufficiently larger than the actual size. The actual waveguide interval $W_0$ is as very small as 5 µm to 50 µm. On the other hand, the lengths of the lead-out parts $7a_1$ and $7a_2$ at the one end and the other end of the first signal electrode 7a and the lengths of the lead-out parts $7b_1$ and $7b_2$ at the one end and the other end of the second signal electrode 7b are each 100 µm or more. Thus, the first and second signal electrode pads $7a_3$ and $7b_3$, first and second ground electrode pads $8a_1$ and $8b_1$, first and second terminal electrode pads $7a_4$ and $7b_4$, and third and fourth ground electrode pads $8a_2$ and $8b_2$ are positioned outside the nearby region NZ of the interaction part MZ and spaced apart from the interaction part MZ.

The ground electrode may be provided on the back surface side of the substrate 2 for stabilization of a reference potential. Although the ground electrode is required not to be provided in the nearby region NZ of the interaction part MZ as described above, the back surface side of the substrate 2 is not addressed. That is, the ground electrode may be provided in the nearby region NZ of the interaction part MZ on the back surface side of the substrate 2.

On the other hand, first and second ground electrode pads $8a_1$ and $8b_1$ are provided in the vicinity of the input parts of the respective first and second signal electrodes 7a and 7b which are positioned outside the nearby region NZ of the interaction part MZ. The first ground electrode pad $8a_1$ is provided adjacent to the first signal electrode pad $7a_3$ constituting the input part of the first signal electrode 7a, and the second ground electrode pad $8b_1$ is provided adjacent to the second signal electrode pad $7b_3$ constituting the input part of the second signal electrode 7b.

Third and fourth ground electrode pads $8a_2$ and $8b_2$ are provided in the vicinity of the terminal parts of the respective first and second signal electrodes 7a and 7b which are positioned outside the nearby region NZ of the interaction part MZ like the input parts of the respective first and second signal electrodes 7a and 7b. The third ground electrode pad $8a_2$ is provided adjacent to the first terminal electrode pad $7a_4$ constituting the terminal part of the first signal electrode 7a, and the fourth ground electrode pad $8b_2$ is provided adjacent to the second terminal electrode pad $7b_4$ constituting the terminal part of the second signal electrode 7b.

In the present embodiment, the first ground electrode pad $8a_1$ and second ground electrode pad $8b_1$ are electrically connected to each other through a short-circuit pattern $8c_1$ (first short-circuit pattern) provided in the same electrode layer as that of the first and second ground electrode patterns $8a_1$ and $8b_1$. Similarly, the third ground electrode pad $8a_2$ and the fourth ground electrode pad $8b_2$ are electrically connected to each other through a short-circuit pattern $8c_2$ (second short-circuit pattern) provided in the same electrode layer as that of the third and fourth ground electrode patterns $8a_2$ and $8b_2$. The short-circuit patterns $8c_1$ and $8c_2$ are formed along the edge of the substrate 2, and thus the first and second signal electrode pads $7a_3$, $7b_3$ and the first and second terminal electrode pads $7a_4$ and $7b_4$ are disposed inside the edge of the substrate 2. The two ground electrode pads which are close to each other are thus short-circuited, and hence, a reference potential at the ground electrode pad can be stabilized to thereby improve high-frequency characteristics.

Figure 2:
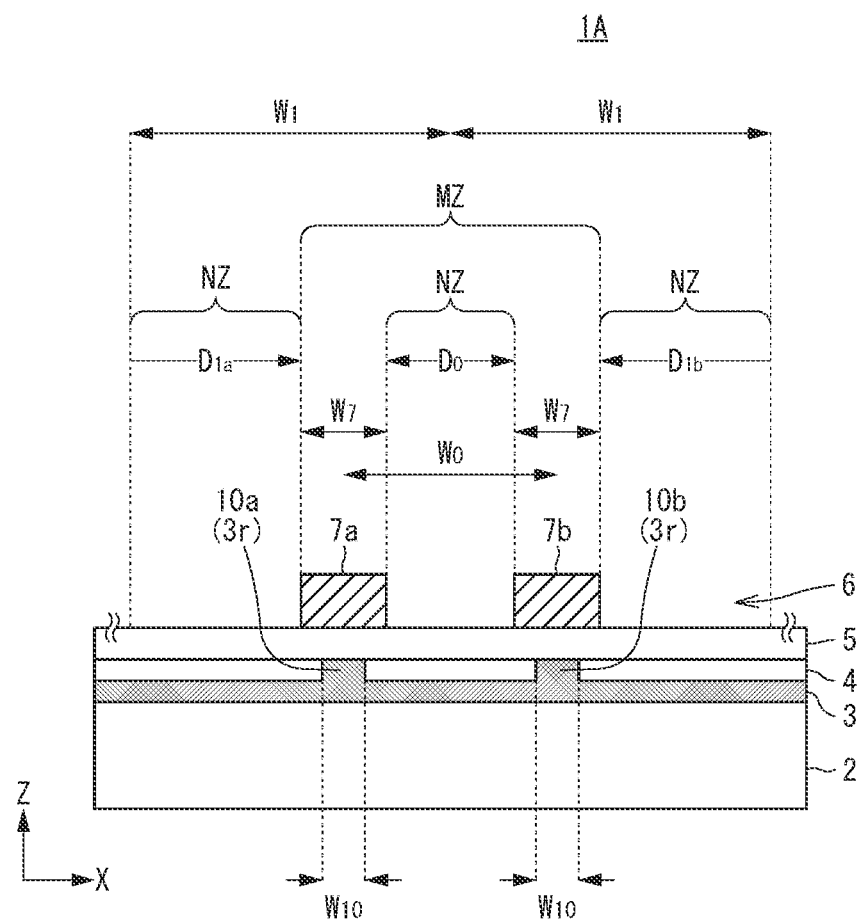
FIG. 2 is a schematic cross-sectional view of the optical modulation element 1A taken along the line X1-X1 in FIGS. 1A and 1B.

FIG. 2 is a schematic cross-sectional view of the optical modulation element 1A taken along the line $X_1$-$X_1$ in FIGS. 1A and 1B.

As illustrated in FIG. 2, the optical modulation element 1A according to the present embodiment has a multilayer structure including a substrate 2, a waveguide layer 3, a protective layer 4, a buffer layer 5, and an electrode layer 6, which are laminated in this order.

The substrate 2 is, e.g., a sapphire substrate, and the waveguide layer 3 of an electrooptic material, such as a lithium niobate film, is formed on the main surface of the substrate 2. The waveguide layer 3 has the first and second optical waveguides 10a and 10b each formed by a ridge part 3r. A width $W_{10}$ of each of the first and second optical waveguides 10a and 10b can be set to, e.g., 1 µm.

The protective layer 4 is formed in an area not overlapping the first and second optical waveguides 10a and 10b in a plan view. The protective layer 4 covers the entire area of the upper surface of the waveguide layer 3 excluding portions where the ridge parts 3r are formed, and the side surfaces of each of the ridge parts 3r are also covered with the protective layer 4, so that scattering loss caused due to the roughness of the side surfaces of the ridge part 3r can be prevented. The thickness of the protective layer 4 is substantially equal to the height of the ridge part 3r of the waveguide layer 3. There is no particular restriction on the material of the protective layer 4 and, for example, silicon oxide ($SiO_2$) may be used.

The buffer layer 5 is formed on the upper surfaces of the ridge parts 3r of the waveguide layer 3 so as to prevent light propagating through the first and second optical waveguides 10a and 10b from being absorbed by the first and second signal electrodes 7a and 7b. The buffer layer 5 is preferably formed of a material having a lower refractive index than those of the waveguide layer 3 and a high transparency, such as $Al_2O_3$, $SiO_2$, $LaAlO_3$, $LaYO_3$, ZnO, $HfO_2$, MgO, or $Y_2O_3$. The thickness of the buffer layer 5 on the upper surface of the ridge part 3r may be about 0.2 µm to 1 µm. The buffer layer 5 is more preferably formed of a material having a high dielectric constant. In the present embodiment, although the buffer layer 5 covers not only the upper surfaces of the respective first and second optical waveguides 10a and 10b, but also the entire underlying surface including the upper surface of the protective layer 4, it may be patterned so as to selectively cover only the vicinity of the upper surfaces of the first and second optical waveguides 10a and 10b. Further, the buffer layer 5 may be directly formed on the upper surface of the waveguide layer 3 with the protective layer 4 omitted.

The film thickness of the buffer layer 5 is preferably as large as possible in view of reduction of light absorption of an electrode and preferably as small as possible in view of application of a high electric field to the optical waveguide. The light absorption and applied voltage of an electrode have a trade-off relation, so that it is necessary to set an adequate film thickness according to the purpose. The dielectric constant of the buffer layer 5 is preferably as high as possible, because the higher the dielectric constant thereof, the more VπL (index representing electric field efficiency) is reduced. Further, the refractive index of the buffer layer 5 is preferably as low as possible, because the lower the refractive index thereof, the thinner the buffer layer 5 can be. In general, a material having a high dielectric constant has a higher refractive index, so that it is important to select a material having a high dielectric constant and a relatively low refractive index considering the balance therebetween. For example, $Al_2O_3$ has a specific dielectric constant of about 9 and a refractive index of about 1.6 and is thus preferable. LaAlO$_3$ has a specific dielectric constant of about 13 and a refractive index of about 1.7, and LaYO$_3$ has a specific dielectric constant of about 17 and a refractive index of about 1.7 and are thus particularly preferable.

The electrode layer 6 is provided with the first signal electrode 7a and second signal electrode 7b. The first signal electrode 7a is provided overlapping the ridge part 3r corresponding to the first optical waveguide 10a so as to modulate the light traveling inside the first optical waveguide 10a and is opposed to the first optical waveguide 10a through the buffer layer 5. The second signal electrode 7b is provided overlapping the ridge part 3r corresponding to the second optical waveguide 10b so as to modulate the light traveling inside the second optical waveguide 10b and is opposed to the second optical waveguide 10b through the buffer layer 5.

As illustrated in FIG. 2, in the cross-section perpendicular to the extending direction of first and second optical waveguides 10a and 10b, an electrode structure is left-right symmetric. Thus, the magnitudes of electric fields applied from the first and second signal electrodes 7a and 7b to the respective first and second optical waveguides 10a and 10b are made the same as much as possible, whereby the wavelength chirp can be reduced.

The waveguide layer 3 is not particularly limited as long as it is made of an electrooptic material and is preferably made of lithium niobate (LiNbO$_3$). This is because lithium niobate has a large electrooptic constant and is thus suitable as the constituent material of an electrooptic device such as an optical modulation element. An explanation will now be given of the configuration of the present embodiment, where the waveguide layer 3 is a lithium niobate film.

Although the substrate 2 is not particularly limited as long as it has a lower refractive index than lithium niobate, the substrate 2 is preferably a substrate on which the lithium niobate film can be formed as an epitaxial film. Specifically, the substrate 2 is preferably a sapphire single crystal substrate or a silicon single crystal substrate. The crystal orientation of the single crystal substrate is not particularly limited. The lithium niobate film can be easily formed as a c-axis oriented epitaxial film on single crystal substrates having different crystal orientations. Since the c-axis oriented lithium niobate film has three-fold symmetry, the underlying single crystal substrate preferably has the same symmetry. Thus, when the sapphire single crystal substrate is used as the substrate 2, it preferably has a c-plane, and when the silicon single crystal substrate is used as the substrate 2, it preferably has a (111) surface.

The epitaxial film refers to a film having the crystal orientation of the underlying substrate or film. When the film in-plane surface is defined as an X-Y plane, and the film thickness direction is as a Z-axis, the crystal is uniformly oriented along the X-, Y-, and Z-axes. For example, an epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002), and other equivalent surfaces.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since LiNbO$_3$ has a trigonal crystal system, single crystal LiNbO$_3$ (014) has 3 poles.

For the lithium niobate film, it is known that crystals rotated by 180° about the c-axis are epitaxially grown in a symmetrically coupled, twin crystal state. In this case, three poles are symmetrically coupled to form six poles. When the lithium niobate film is formed on a single crystal silicon substrate having a (100) surface, the substrate has four-fold symmetry, and 4×3=12 poles are observed. In the present invention, the lithium niobate film epitaxially grown in the twin crystal state is also considered to be an epitaxial film.

The lithium niobate film has a composition of Li$_x$Nb$_A$y$O_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of 2 μm or less. This is because a high-quality lithium niobate film having a thickness more than 2 μm is difficult to form. The lithium niobate film having an excessively small thickness cannot completely confine light in it, disadvantageously allowing the light to penetrate through the substrate 2 and/or the buffer layer 5. Application of an electric field to the lithium niobate film may therefore cause a change in the effective refractive index of the optical waveguide (10a, 10b) to decrease. Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 2 can change the optical refractive index in proportion to the electric field. In the case of the single crystal substrate made of sapphire, the lithium niobate film can be directly epitaxially grown on the sapphire single crystal substrate. In the case of the single crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of Y$_2$O$_3$.

As a formation method for the lithium niobate film, there is known a method of thinly polishing or slicing the lithium niobate single crystal substrate. This method has an advantage that characteristics same as those of the single crystal can be obtained and can be applied to the present invention.

A width $W_7$ of the first and second signal electrodes 7a and 7b is slightly larger than a ridge width $W_{10}$ of the ridge-shaped first and second optical waveguides 10a and 10b of a lithium niobate film. To concentrate an electric field from the first and second signal electrodes 7a and 7b on the first and second optical waveguides 10a and 10b, the width $W_7$ of the first and second signal electrodes 7a and 7b is preferably 1.1 times to 15 times, more preferably, 1.5 times to 10 times the ridge width $W_{10}$ of the second optical waveguide 10b. The interval between signal electrodes refers to the distance between the width direction center of the first signal electrode 7a and the width direction center of the second signal electrode 7b. The interval between the waveguides refers to the distance between the width direction center of the first optical waveguide 10a to the width direction center of the second optical waveguide 10b. In the present embodiment, the interval between the signal electrodes and the interval between the optical waveguides are substantially equal to each other.

No ground electrode is provided in a part of the electrode layer 6 positioned in the nearby region NZ of the interaction part MZ. When the ground electrode is provided in an electrode isolation region $D_0$ between the first and second signal electrodes 7a and 7b or nearby regions $D_{1a}$ and $D_{1b}$ outside the respective first and second signal electrodes 7a and 7b, ripple or crosstalk is increased to deteriorate high-frequency characteristics. Such deterioration in high-frequency characteristics is considered to be caused by the fact that the width or area of the ground electrode cannot sufficiently be ensured due to miniaturization of an optical modulation element to result in an unstable ground potential. When no ground electrode is provided as in the present embodiment, ripple or crosstalk can be reduced to thereby improve high-frequency characteristics.

The above-described first to fourth ground electrode pads $8a_1$, $8b_1$, $8a_2$, $8b_2$ and short-circuit patterns $8c_1$, $8c_2$ are provided in the electrode layer 6 together with the signal electrode pads $7a_3$, $7b_3$ of the first and second signal electrodes 7a and 7b and the first and second terminal electrode pads $7a_4$, $7b_4$. These ground electrodes are provided outside the nearby region NZ of the interaction part MZ and thus do not cause ripple or crosstalk at a low frequency of 50 GHz or less. Further, radiation loss at a high frequency of 50 GHz or more can be reduced.

Figure 3A:
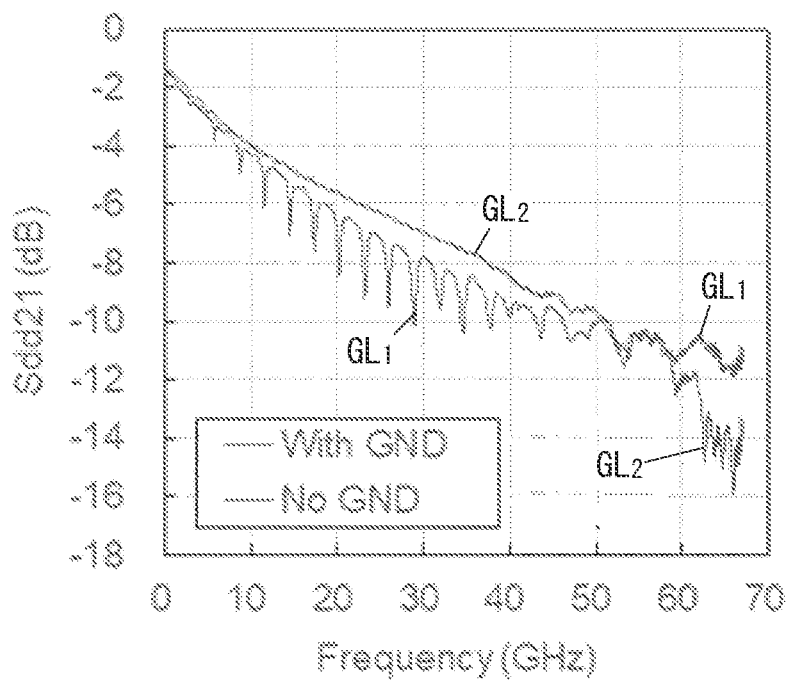
FIGS. 3A and 3B are graphs illustrating frequency characteristics of transmission loss (Sdd21) in optical modulation elements.
Figure 3B:
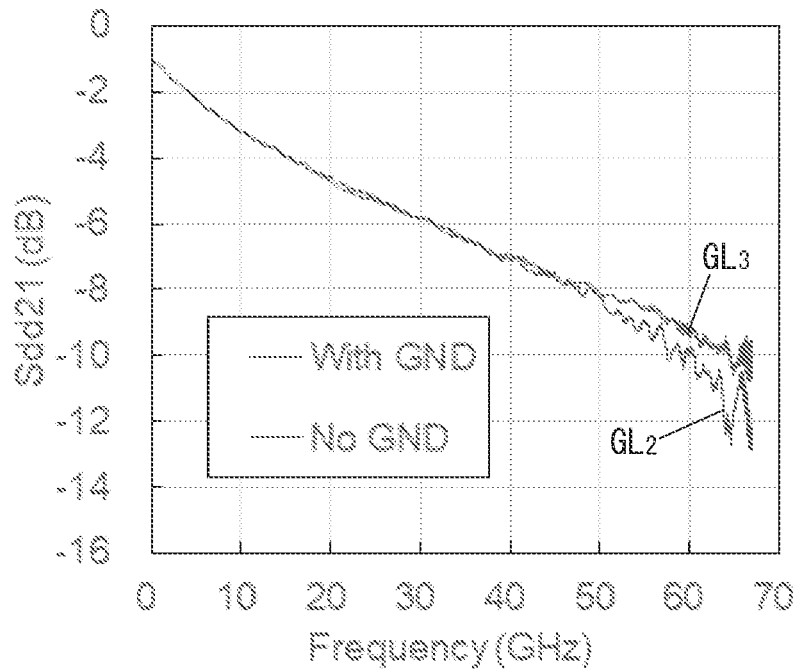

FIGS. 3A and 3B are graphs illustrating frequency characteristics of transmission loss ($S_{dd21}$) in optical modulation elements.

FIG. 3A illustrates the transmission loss in the optical modulation element having a conventional electrode structure in which the ground electrode is provided in the nearby region NZ of the interaction part MZ. As indicated by the curve $GL_1$ of FIG. 3A, ripple or crosstalk occurs at a low frequency of 50 GHz or less. On the other hand, as indicated by the curves $GL_2$ in the graphs of FIGS. 3A and 3B, in an optical modulation element in which the ground electrode is omitted from the entire substrate surface including the nearby region NZ of the interaction part MZ, ripple or crosstalk does not occur at a low frequency of 50 GHz or less. However, no ground electrode is provided in the vicinity of the input and terminal parts of each of the first and second signal electrodes 7a and 7b, so that the transmission loss increases at a high frequency of 50 GHz or more.

FIG. 3B illustrates the transmission loss of the optical modulation element according to the present embodiment, in which the ground electrode is not provided in the nearby region NZ of the interaction part MZ but provided in the vicinity of the input and terminal parts of each of the first and second signal electrodes 7a and 7b. As indicated by the curve $GL_3$ of FIG. 3B, not only that ripple or crosstalk is reduced at a low frequency of 50 GHz or less, but also that the transmission loss is reduced at a high frequency of 50 GHz or more.

As described above, in the optical modulation element 1A according to the present embodiment, no ground electrode is provided in the nearby region NZ of the interaction part MZ, so that electrode loss can be reduced to improve the efficiency of an electric field to be applied to the optical waveguide, thereby allowing low voltage driving. Further, in the optical modulation element 1A according to the present embodiment, the ground electrode is provided in the vicinity of at least one of the input and terminal parts of each of the first and second signal electrodes 7a and 7b outside the nearby region NZ of the interaction part MZ, so that radiation loss at a high frequency of 50 GHz or more can be reduced. Hence, an optical modulation element with improved high-frequency characteristics can be provided.

Figure 4:
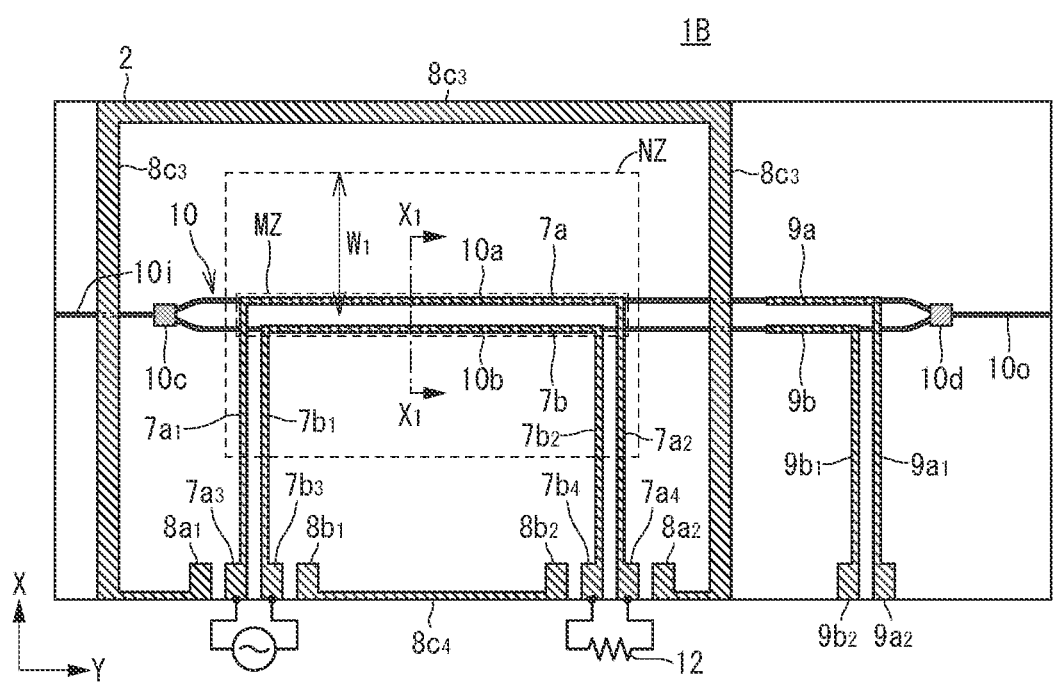
FIG. 4 is a schematic plan view illustrating the configuration of an optical modulation element according to a second embodiment of the present invention.

FIG. 4 is a schematic plan view illustrating the configuration of an optical modulation element according to a second embodiment of the present invention.

As illustrated in FIG. 4, an optical modulation element 1B is featured as follows: the first and third ground electrode pads $8a_1$ and $8a_2$ on the respective input part and terminal part sides of the first signal electrode 7a are electrically connected to each other through a short-circuit pattern $8c_3$ (third short-circuit pattern) surrounding the interaction part MZ; and the second and fourth ground electrode pads $8b_1$ and $8b_2$ on the respective input part and terminal part sides are electrically connected to each other through a short-circuit pattern $8c_4$ (fourth short-circuit pattern). Further, the first and second signal electrode pads $7a_3$ and $7b_3$ are disposed close to the edge of the substrate 2, and the first and second terminal electrode pads $7a_4$ and $7b_4$ are also disposed close to the edge of the substrate 2. Other configurations are the same as those of the first embodiment.

Like the first to fourth ground electrode pads $8a_1$, $8b_1$, $8a_2$, and $8b_2$, the short-circuit patterns $8c_3$ and $8c_4$ are disposed outside the nearby region NZ of the interaction part MZ. Thus, no ground electrode is provided in the nearby region NZ of the interaction part MZ. According to the present embodiment, radiation loss at a high frequency of 50 GHz or more can be reduced as in the first embodiment.

In the present embodiment, although the first and second ground electrode pads $8a_1$ and $8b_1$ on the input part side are not connected to each other through a short-circuit pattern, and the third and fourth ground electrode pads $8a_2$ and $8b_2$ on the terminal part side are not connected to each other through a short-circuit pattern, the same configuration as that of the first embodiment may be employed. In this case, the first and second signal electrode pads $7a_3$, $7b_3$ and the first and second terminal electrode pads $7a_4$, $7b_4$ are disposed apart from the edge of the substrate 2.

Figure 5:
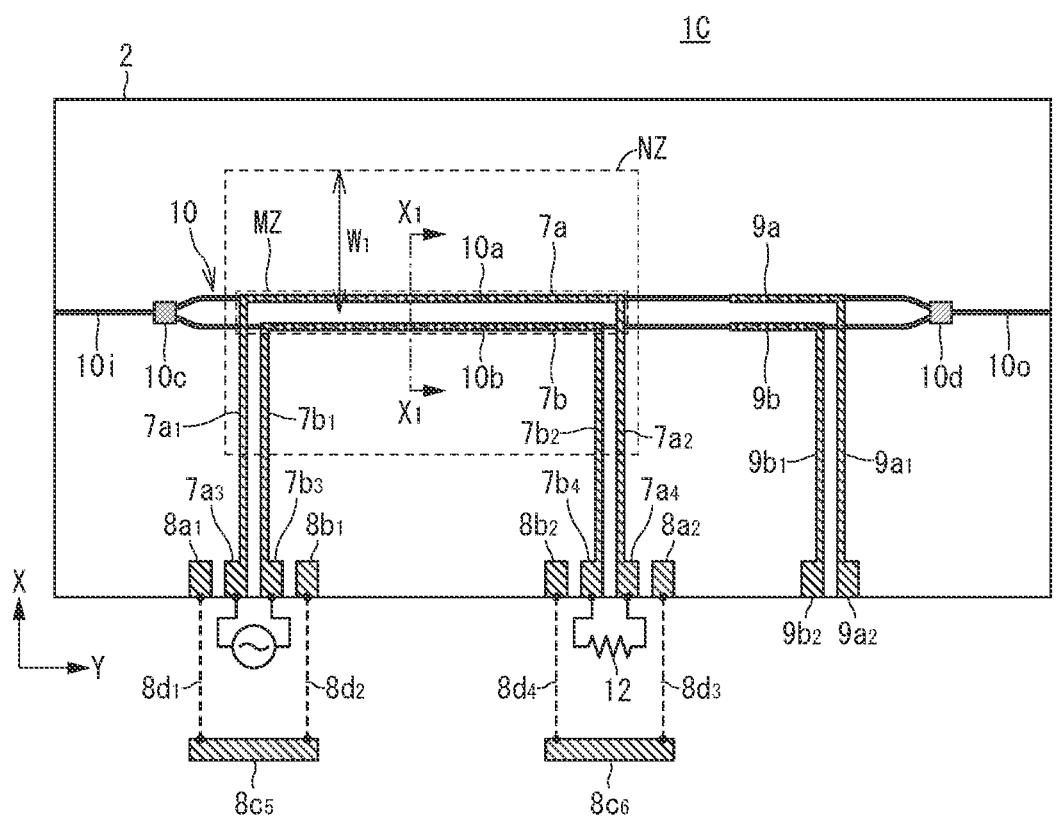
FIG. 5 is a schematic plan view illustrating the configuration of an optical modulation element according to a third embodiment of the present invention.

FIG. 5 is a schematic plan view illustrating the configuration of an optical modulation element according to a third embodiment of the present invention.

As illustrated in FIG. 5, an optical modulation element 1C is featured as follows: the first and second ground electrode pads $8a_1$ and $8b_1$ on the input part sides of the respective first and second signal electrodes 7a and 7b are electrically connected to each other through respective contact plugs $8d_1$ and $8d_2$ penetrating the substrate 2 and a short-circuit pattern $8c_5$ formed on the back side of the substrate 2; and the third and fourth ground electrode pads $8a_2$ and $8b_2$ on the terminal part sides of the respective first and second signal electrodes 7a and 7b are electrically connected to each other through respective contact plugs $8d_3$ and $8d_4$ penetrating the substrate 2 and a short-circuit pattern $8c_6$ formed on the back side of the substrate 2. The short-circuit patterns 8c5 and 8c6 may be formed as a single ground pattern and, alternatively, a ground pattern serving as the short-circuit patterns 8c5 and 8c6 may be formed on the entire back surface of the substrate 2. Further, the first and second signal electrode pads $7a_3$ and $7b_3$ are disposed close to the edge of the substrate 2, and the first and second terminal electrode pads $7a_4$ and $7b_4$ are also disposed close to the edge of the substrate 2. Other configurations are the same as those of the first embodiment.

Like the first to fourth ground electrode pads $8a_1$, $8b_1$, $8a_2$, and $8b_2$, the short-circuit patterns $8c_5$ and $8c_6$ are disposed outside the nearby region NZ of the interaction part MZ. Thus, no ground electrode is provided in the nearby region NZ of the interaction part MZ. According to the present embodiment, radiation loss at a high frequency of 50 GHz or more can be reduced as in the first embodiment.

Figure 6:
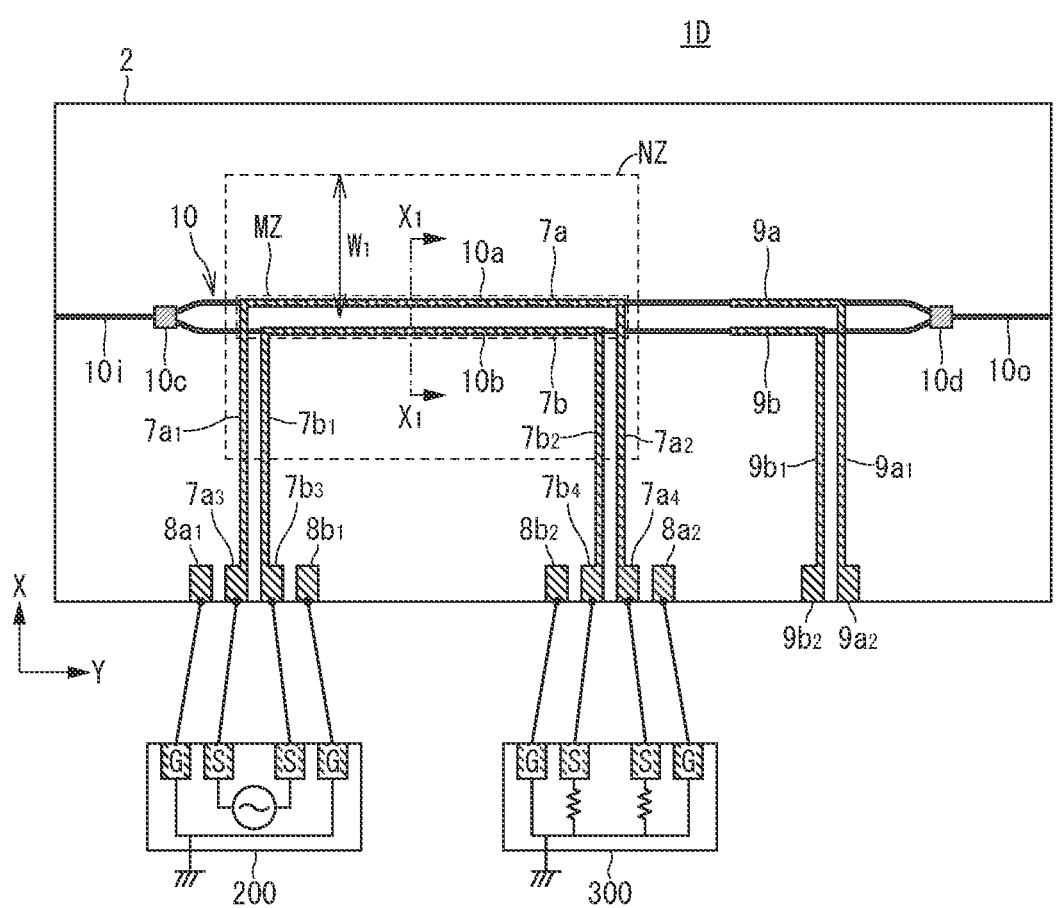
FIG. 6 is a schematic plan view illustrating the configuration of an optical modulation element according to a fourth embodiment of the present invention.

FIG. 6 is a schematic plan view illustrating the configuration of an optical modulation element according to a fourth embodiment of the present invention.

As illustrated in FIG. 6, an optical modulation element 1D is featured as follows: the first and second ground electrode pads $8a_1$ and $8b_1$ are electrically connected to each other through a ground line in a driver circuit 200 connected to the input parts of the respective first and second signal electrodes 7a and 7b; and the third and fourth ground electrode pads $8a_2$ and $8b_2$ are electrically connected to each other through a ground line in a terminator 300 connected to the terminal parts of the respective first and second signal electrodes 7a and 7b. Further, the first and second signal electrode pads $7a_3$ and $7b_3$ are disposed close to the edge of the substrate 2, and the first and second terminal electrode pads $7a_4$ and $7b_4$ are also disposed close to the edge of the substrate 2. Other configurations are the same as those of the first embodiment.

The ground line in the driver circuit 200 and the ground line in the terminator 300 are disposed outside the nearby region NZ of the interaction part MZ. Thus, no ground electrode is provided in the nearby region NZ of the interaction part MZ. According to the present embodiment, radiation loss at a high frequency of 50 GHz or more can be reduced as in the first embodiment.

Figure 7:
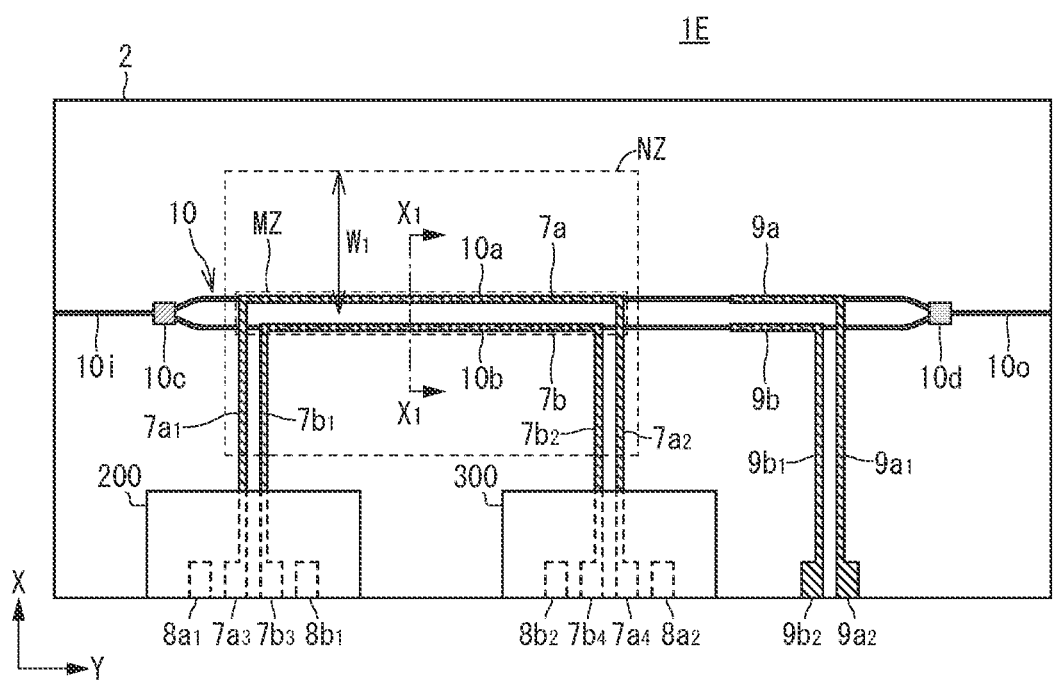
FIG. 7 is a schematic plan view illustrating the configuration of an optical modulation element according to a fifth embodiment of the present invention.

FIG. 7 is a schematic plan view illustrating the configuration of an optical modulation element according to a fifth embodiment of the present invention.

As illustrated in FIG. 7, an optical modulation element 1E is a modification of the optical modulation element 1D according to the fourth embodiment and is featured in that the driver circuit 200 and terminator 300 illustrated in FIG. 6 are flip-chip mounted on the substrate 2. Other configurations are the same as those of the fourth embodiment. Thus, the optical modulation element 1E according to the present embodiment can achieve not only the same effect as that in the fourth embodiment but also miniaturization of the entire optical modulation element.

Figure 8:
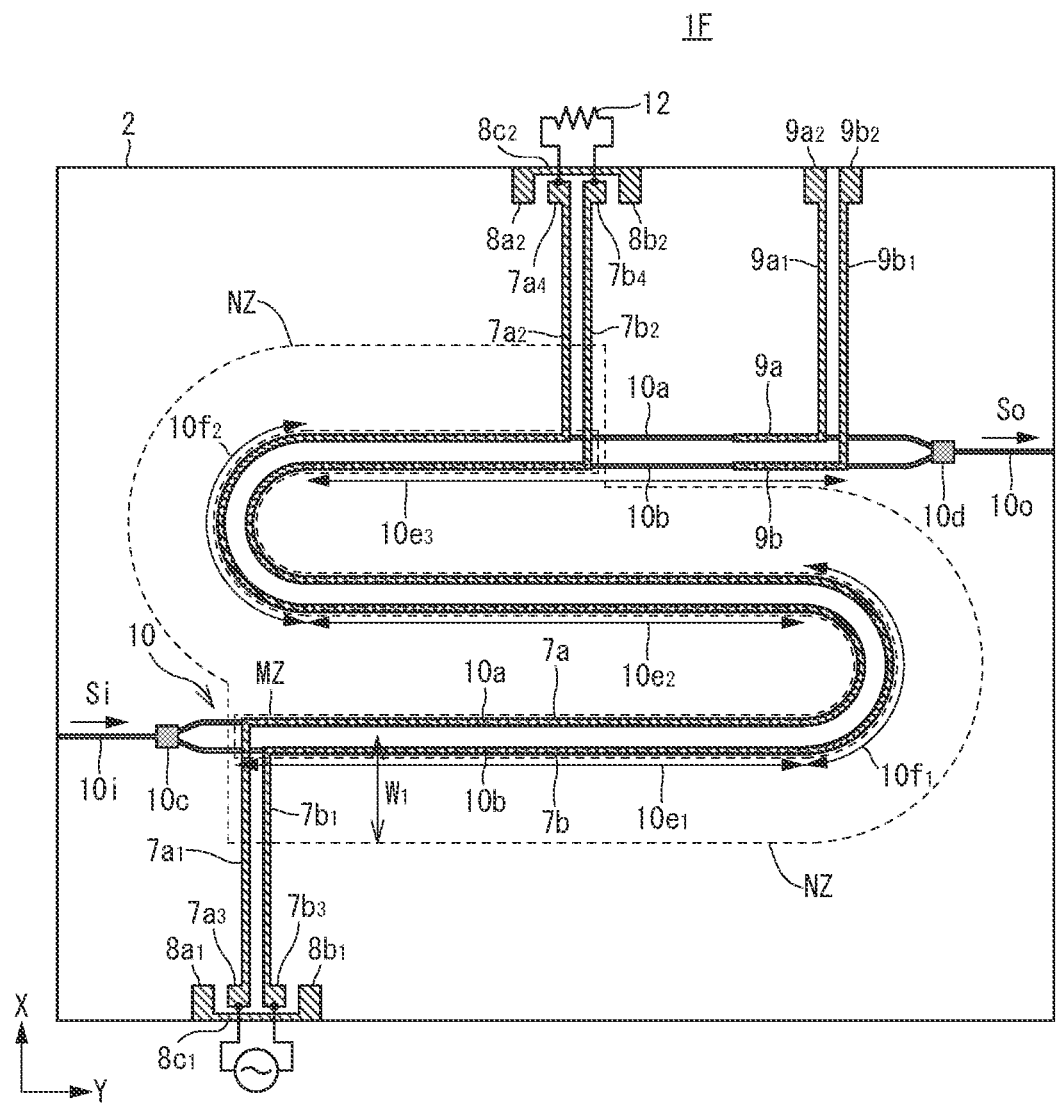
FIG. 8 is a schematic plan view illustrating the configuration of an optical modulation element according to a sixth embodiment of the present invention.

FIG. 8 is a schematic plan view illustrating the configuration of an optical modulation element according to a sixth embodiment of the present invention.

As illustrated in FIG. 8, an optical modulation element 1F is featured in that the Mach-Zehnder optical waveguide 10 is constituted by a combination of a linear section and a curved section. Specifically, the Mach-Zehnder optical waveguide 10 has first to third linear sections $10e_1$, $10e_2$, and $10e_3$ arranged parallel to one another, a first curved section $10f_1$ connecting the first and second linear sections $10e_1$ and $10e_2$, and a second curved section $10f_2$ connecting the second and third linear sections $10e_2$ and $10e_3$. The first and second curved sections $10f_1$ and $10f_2$ are concentrically arranged in a semicircular shape so as to turn the traveling direction of the optical waveguide by 180°. Other configurations are the same as those of the first embodiment.

In the present embodiment, most of the first linear section $10e_1$ of the Mach-Zehnder optical waveguide 10, whole of the second linear section $10e_2$, whole of the first and second curved sections $10f_1$ and $10f_2$, and a part of the third linear section $10e_3$ constitute the interaction part MZ together with the first and second signal electrodes 7a and 7b. The input light Si is input to one end of the first linear section $10e_1$, travels from the one end of the first linear section $10e_1$ toward the other end thereof, makes a U-turn at the first curved section $10f_1$, travels from one end of the second linear section $10e_2$ toward the other end thereof in the direction opposite to that in the first linear section $10e_1$, makes a U-turn at the second curved section $10f_2$, and travels from one end of the third linear section $10e_3$ toward the other end thereof in the same direction as that in the first linear section $10e_1$.

The Mach-Zehnder optical modulation element has a problem of a long element length in practical applications. However, by folding the optical waveguide as illustrated, the element length can be significantly reduced, obtaining a remarkable effect for miniaturization. In particular, an optical waveguide formed of the lithium niobate film is featured in that it has a small loss even when the curvature radius of the curved section is reduced up to about 50 μm and is thus suitable for the present embodiment.

In the present embodiment as well, no ground electrode is provided in the nearby region NZ of the interaction part MZ. Providing a ground electrode having an insufficient size in the vicinity of the first and second signal electrodes 7a and 7b constituting the interaction part MZ may deteriorate high-frequency characteristics. In particular, when the optical waveguide has the first and second curved sections $10f_1$ and $10f_2$, and the ground electrode is provided in the vicinity of the first and second curved sections $10f_1$ and $10f_2$, a high-frequency signal increasingly leaks at the curved section, making high-frequency characteristics likely to be deteriorated. However, the ground electrode is omitted in the present embodiment, so that it is possible to prevent deterioration in high-frequency characteristics caused by the ground electrode and to facilitate miniaturization and multiplexing of the optical modulation element.

Further, in the present embodiment as well, the ground electrode is provided in the vicinity of the input and terminal parts of each of the first and second signal electrodes 7a and 7b which are positioned outside the nearby region NZ of the interaction part MZ. Specifically, the first and second ground electrode pads $8a_1$ and $8b_1$ are provided in the vicinity of the input parts of the respective first and second signal electrodes 7a and 7b which are remote from the interaction part MZ. The first ground electrode pad $8a_1$ is provided adjacent to the first signal electrode pad $7a_3$ constituting the input part of the first signal electrode 7a, and the second ground electrode pad $8b_1$ is provided adjacent to the second signal electrode pad $7b_3$ constituting the input part of the second signal electrode 7b. The first and second ground electrode pads $8a_1$ and $8b_1$ are connected to each other through the short-circuit pattern $8c_1$.

As in the input parts of the first and second signal electrodes 7a and 7b, the third and fourth ground electrode pads $8a_2$ and $8b_2$ are provided in the vicinity of the terminal parts of the respective first and second signal electrodes 7a and 7b which are remote from the interaction part MZ. The third ground electrode pad $8a_2$ is provided adjacent to the first terminal electrode pad $7a_4$ constituting the terminal part of the first signal electrode 7a, and the fourth ground electrode pad $8b_2$ is provided adjacent to the second terminal electrode pad $7b_4$ constituting the terminal part of the second signal electrode 7b. The third and fourth ground electrode pads $8a_2$ and $8b_2$ are connected to each other through the short-circuit pattern $8c_2$.

As described above, in the optical modulation element 1F, no ground electrode is provided in the nearby region NZ of the interaction part MZ but provided in the vicinity of the input and terminal parts of the first and second signal electrodes $7a$ and $7b$ which are positioned outside the nearby region NZ, so that radiation loss at a high frequency of 50 GHz or more can be reduced. Hence, an optical modulation element with improved high-frequency characteristics can be provided.

Figure 9:
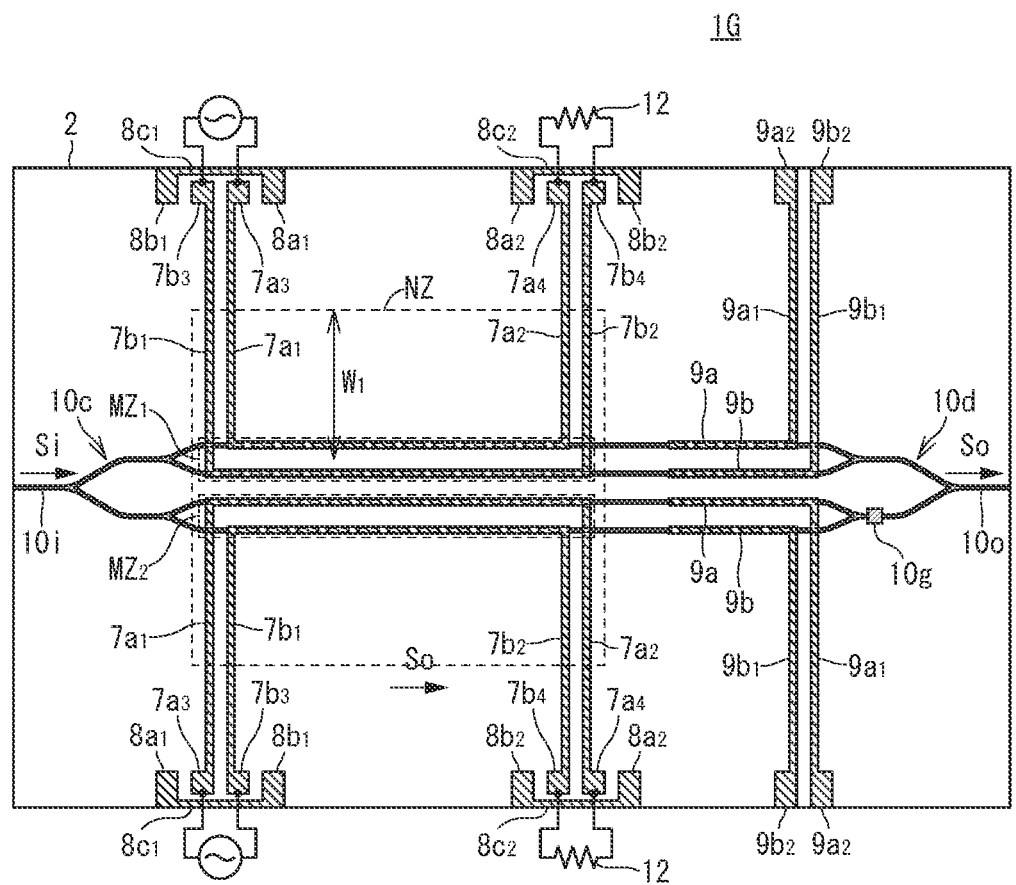
FIG. 9 is a schematic plan view illustrating the configuration of an optical modulation element according to a seventh embodiment of the present invention.

FIG. 9 is a schematic plan view illustrating the configuration of an optical modulation element according to a seventh embodiment of the present invention.

As illustrated in FIG. 9, an optical modulation element 1G according to the present embodiment is featured in that it has a two-channel array structure in which two interaction parts of the Mach-Zehnder optical modulation element are arranged and uses first and second interaction parts $MZ_1$ and $MZ_2$ to perform quadrature phase shift keying (QPSK) or cross quadrature amplitude modulation (xQAM) for the input light Si. That is, the optical modulation element 1G according to the present embodiment is an IQ optical modulation element constituted using the first and second interaction parts $MZ_1$ and $MZ_2$, and a phase shifter 10 g is provided on the output side of the second interaction part $MZ_2$. The configuration of each of the interaction parts $MZ_1$ and $MZ_2$ is the same as that of the single interaction part MZ of the Mach-Zehnder optical modulation element illustrated in FIG. 1. Different differential signals are applied respectively to a pair of RF signal input terminals (first and second signal electrode pads $7a_3$ and $7b_3$) of the first and second interaction parts $MZ_1$ and $MZ_2$.

The input waveguide $10i$ constituted by a single optical waveguide is divided into four parts at two-stage demultiplexer $10c$ to form two pairs of two optical waveguides. That is, first and second optical waveguides $10a$ and $10b$ constituting the first interaction part $MZ_1$ and first and second optical waveguides $10a$ and $10b$ constituting the second interaction part $MZ_2$ are formed. At the output side, the optical waveguides are combined into a single output waveguide $10o$ at two-stage multiplexer $10d$.

In the present embodiment as well, no ground electrode is provided in the vicinity of the nearby region NZ of the first and second interaction parts $MZ_1$ and $MZ_2$. In particular, no ground electrode is provided in an inter-channel region between the second signal electrode $7b$ of the first interaction part $MZ_1$ and the first signal electrode $7a$ of the second interaction part $MZ_2$. When an optical modulation element is miniaturized and multiplexed, it becomes difficult to provide a ground electrode having a sufficient width or sufficient area in the inter-channel region, and a ground electrode having an insufficient size may deteriorate high-frequency characteristics. However, in the present embodiment, the ground electrode is omitted, so that high-frequency characteristics do not deteriorate even with miniaturization, and the optical modulation element can be easily multiplexed.

On the other hand, the ground electrode is provided in the vicinity of the input and terminal parts of each of the first and second signal electrodes $7a$ and $7b$ which are remote from the nearby region NZ of the first and second interaction parts $MZ_1$ and $MZ_2$. Specifically, the first and second ground electrode pads $8a_1$ and $8b_1$ are provided in the vicinity of the input parts of the respective first and second signal electrodes $7a$ and $7b$ which are remote from the first and second interaction parts $MZ_1$ and $MZ_2$. The first ground electrode pad $8a_1$ is provided adjacent to the first signal electrode pad $7a_3$ constituting the input part of the first signal electrode $7a$, and the second ground electrode pad $8b_1$ is provided adjacent to the second signal electrode pad $7b_3$ constituting the input part of the second signal electrode $7b$. The first and second ground electrode pads $8a_1$ and $8b_1$ are connected to each other through the short-circuit pattern $8c_1$.

As in the input parts of the first and second signal electrodes $7a$ and $7b$, the third and fourth ground electrode pads $8a_2$ and $8b_2$ are provided in the vicinity of the terminal parts of the respective first and second signal electrodes $7a$ and $7b$ which are remote from the nearby region NZ of the first and second interaction parts $MZ_1$ and $MZ_2$. The third ground electrode pad $8a_2$ is provided adjacent to the first terminal electrode pad $7a_4$ constituting the terminal part of the first signal electrode $7a$, and the fourth ground electrode pad $8b_2$ is provided adjacent to the second terminal electrode pad $7b_4$ constituting the terminal part of the second signal electrode $7b$. The third and fourth ground electrode pads $8a_2$ and $8b_2$ are connected to each other through the short-circuit pattern $8c_2$.

As described above, in the optical modulation element 1G according to the present embodiment, no ground electrode is provided in the nearby region NZ of the first and second interaction parts $MZ_1$ and $MZ_2$ but provided in the vicinity of the input and terminal parts of the first and second signal electrodes $7a$ and $7b$ which are positioned outside the nearby region NZ, so that radiation loss at a high frequency of 50 GHz or more can be reduced. Hence, an optical modulation element with improved high-frequency characteristics can be provided.

Figure 10:
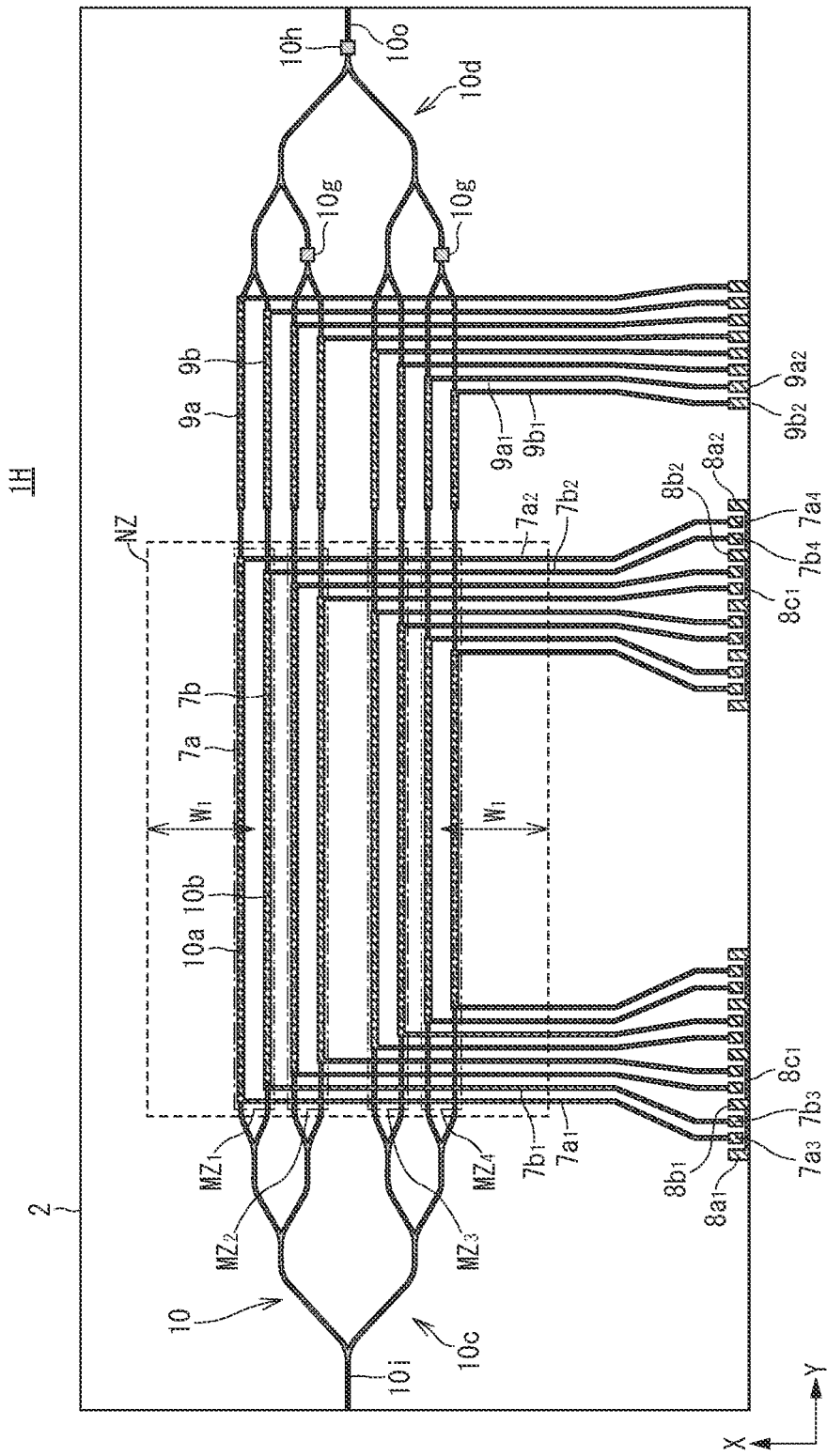
FIG. 10 is a schematic plan view illustrating the configuration of an optical modulation element according to an eighth embodiment of the present invention.

FIG. 10 is a schematic plan view illustrating the configuration of an optical modulation element according to an eighth embodiment of the present invention.

As illustrated in FIG. 10, an optical modulation element 1H according to the present embodiment is featured in that it has a four-channel array structure in which four interaction parts of the Mach-Zehnder optical waveguide are arranged and uses interaction parts $MZ_1$, $MZ_2$, $MZ_3$, and $MZ_4$ to perform dual polarization quadrature phase shift keying (DP-QPSK). The first and second interaction parts $MZ_1$ and $MZ_2$ constitute a first IQ modulator and the third and fourth interaction parts $MZ_3$ and $MZ_4$ constitute a second IQ modulator. An output of each of the first and second IQ modulators is output through a polarization multiplexing waveguide $10h$. The configuration of each of the interaction parts $MZ_2$ to $MZ_4$ is the same as that of the single interaction part of the optical modulation element 1A illustrated in FIG. 1.

In the present embodiment as well, no ground electrode is provided in the nearby region NZ of the first to fourth interaction parts $MZ_1$, $MZ_2$, $MZ_3$, and $MZ_4$. In particular, no ground electrode is provided in an inter-channel region between the second signal electrode $7b$ and the first signal electrode $7a$ adjacent to each other and belonging to different interaction parts. When an optical modulation element is miniaturized and multiplexed, it becomes difficult to provide a ground electrode having a sufficient width or sufficient area in the inter-channel region, and a ground electrode having an insufficient size may deteriorate high-frequency characteristics. However, in the present embodiment, the ground electrode is omitted, so that high-frequency characteristics do not deteriorate even with miniaturization of the optical modulation element, and the optical modulation element can be easily multiplexed.

On the other hand, the ground electrode is provided in the vicinity of the input and terminal parts of each of the first and second signal electrodes $7a$ and $7b$ which are remote from the nearby region NZ of the first to fourth interaction parts $MZ_1$, $MZ_2$, $MZ_3$, and $MZ_4$. Specifically, the first and second ground electrode pads $8a_1$ and $8b_1$ are provided in the vicinity of the input parts of the respective first and second signal electrodes 7a and 7b which are remote from the first to fourth interaction parts $MZ_1$, $MZ_2$, $MZ_3$, and $MZ_4$. The first ground electrode pad $8a_1$ is provided adjacent to the first signal electrode pad $7a_3$ constituting the input part of the first signal electrode 7a, and the second ground electrode pad $8b_1$ is provided adjacent to the second signal electrode pad $7b_3$ constituting the input part of the second signal electrode 7b.

As in the input parts of the first and second signal electrodes 7a and 7b, the third and fourth ground electrode pads $8a_2$ and $8b_2$ are provided in the vicinity of the terminal parts of the respective first and second signal electrodes 7a and 7b which are remote from the first to fourth interaction parts $MZ_1$, $MZ_2$, $MZ_3$, and $MZ_4$. The third ground electrode pad $8a_2$ is provided adjacent to the first terminal electrode pad $7a_4$ constituting the terminal part of the first signal electrode 7a, and the fourth ground electrode pad $8b_2$ is provided adjacent to the second terminal electrode pad $7b_4$ constituting the terminal part of the second signal electrode 7b. The third and fourth ground electrode pads $8a_2$ and $8b_2$ are connected to each other through the short-circuit pattern $8c_2$.

As described above, in the optical modulation element 1H according to the present embodiment, the ground electrode is not provided in the nearby region NZ of the first to fourth interaction parts $MZ_1$, $MZ_2$, $MZ_3$, and $MZ_4$ but provided in the vicinity of the input and terminal parts of the first and second signal electrodes 7a and 7b which are remote from the nearby region NZ, so that radiation loss at a high frequency of 50 GHz or more can be reduced. Hence, an optical modulation element with improved high-frequency characteristics can be provided.

Figure 11:
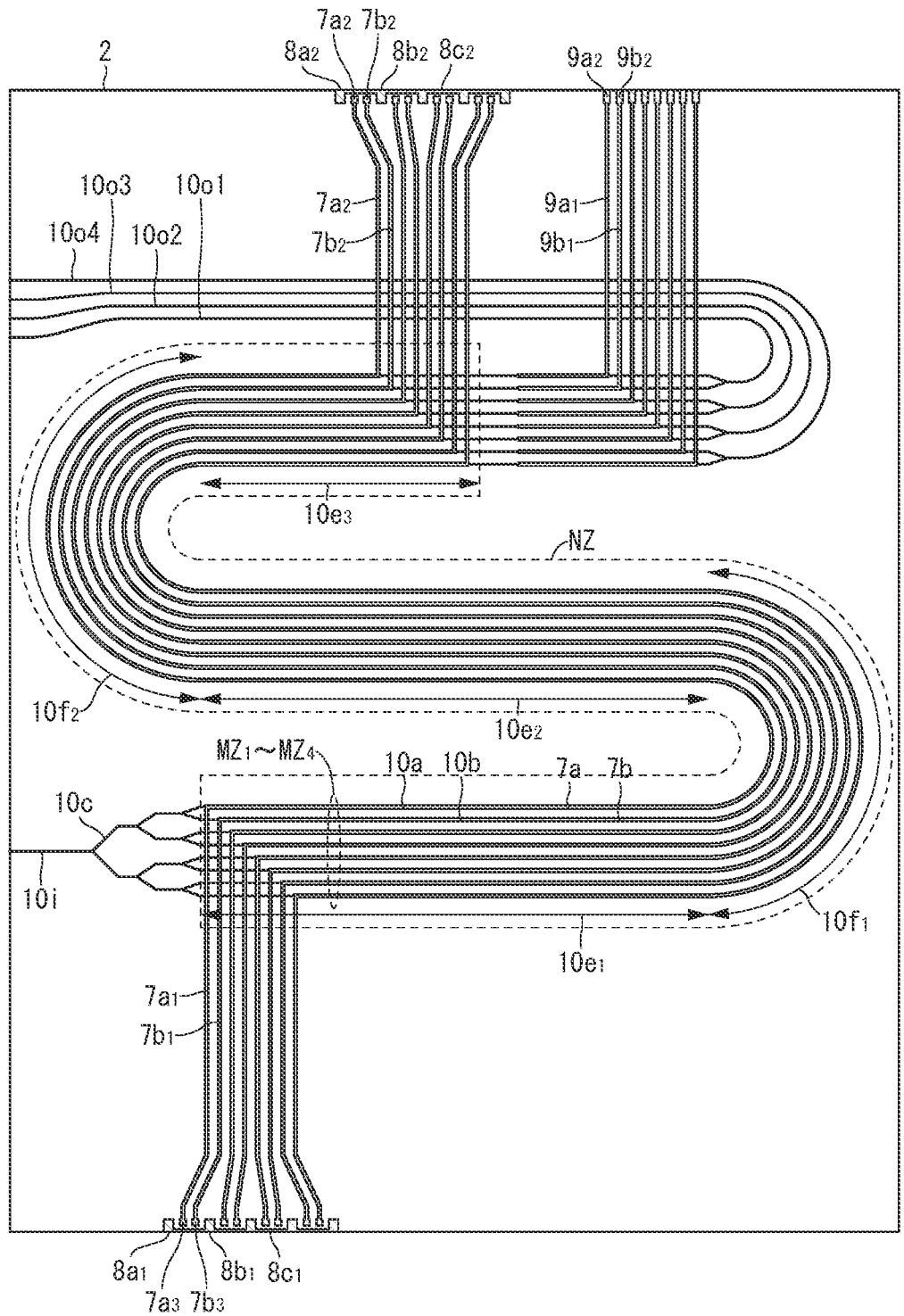
FIG. 11 is a schematic plan view illustrating the configuration of an optical modulation element according to a ninth embodiment of the present invention.

FIG. 11 is a schematic plan view illustrating the configuration of an optical modulation element according to a ninth embodiment of the present invention.

As illustrated in FIG. 11, an optical modulation element 1I according to the present embodiment is featured in that, in the optical modulation element having the four-channel array structure illustrated in FIG. 10, the first to fourth interaction parts $MZ_1$, $MZ_2$, $MZ_3$, and $MZ_4$ are each constituted by a combination of a linear section and a curved section. That is, the optical modulation element according to the present embodiment is obtained by combining the optical modulation elements according to the sixth and eighth embodiments.

In the present embodiment, output from the respective channels are not multiplexed but output individually. Therefore, the Mach-Zehnder optical waveguide 10 has first to fourth output waveguides $10o_1$, $10o_2$, $10o_3$, and $10o_4$.

As described above, when the optical waveguide has the curved section in the multichannel structure, a problem of crosstalk becomes remarkable. However, since no ground electrode is provided in the vicinity of the signal electrode, the crosstalk can be reduced.

While the preferred embodiments of the present invention have been described, the present invention is not limited to the above embodiments, and various modifications may be made within the scope of the present invention, and all such modifications are included in the present invention.

For example, in the above respective embodiments, the ground electrode is provided in the vicinity of both the input and terminal parts of each of the first and second signal electrodes 7a and 7b which are remote from the nearby region NZ of the interaction part MZ; however, the ground electrode need not necessarily be provided in the vicinity of both the input and terminal parts and may be provided in the vicinity of only one of the input and terminal parts.

Further, in the above respective embodiments, the optical modulation element has a pair of optical waveguides each formed of the lithium niobate film epitaxial grown on the substrate 2; however, the present invention is not limited to such a structure, but the optical waveguides may be formed of an electrooptic material such as barium titanate or lead zirconium titanate. However, while the optical waveguide formed of the lithium niobate film can be reduced in width, a problem of ground electrode layout is conspicuous, and thus the effects of the present invention are significant. Further, as the waveguide layer 3, a semiconductor material, a polymer material, or the like having electrooptic effect may be used.

Further, in FIG. 1 and other figures, a configuration of the lead-out part obtained by bending the signal electrode at right angles is illustrated; however, the present invention is not limited to this, and the lead-out part formed by bending the signal electrode in a circular arc shape may be used in view of high-frequency characteristics. In this case, the curvature radius may be appropriately set in accordance with, for example, the width of the signal electrode.

REFERENCE SIGNS LIST 1A to 1I: Optical modulation element
2: Substrate
3: Waveguide layer
3r: Ridge part
4: Protective layer
5: Buffer layer
6: Electrode layer
7a: First signal electrode
7b: Second signal electrode
$7a_1$, $7a_2$: Lead-out part of first signal electrode
$7a_3$: First signal electrode pad
$7a_4$: First terminal electrode pad
7b: Second signal electrode
$7b_1$, $7b_2$: Lead-out part of second signal electrode
$7b_3$: Second signal electrode pad
$7b_4$: Second terminal electrode pad
$8a_1$: First ground electrode pad
$8b_1$: Second ground electrode pad
$8a_2$: Third ground electrode pad
$8b_2$: Fourth ground electrode pad
$8c_1$ to $8c_6$: Short-circuit pattern
$8d_1$ to $8d_4$: Contact plug
9a: First bias electrode
$9a_1$: One end of first bias electrode
9b: Second bias electrode
$9b_1$: One end of second bias electrode
10: Mach-Zehnder optical waveguide
10a: First optical waveguide
10b: Second optical waveguide
10c: Demultiplexer
10d: Multiplexer
$10e_1$: First linear section
$10e_2$: Second linear section
$10e_3$: Third linear section
$10f_1$: First curved section
$10f_2$: Second curved section
10g: Phase shifter
10i: Input waveguide
10o: Output waveguide
12: Terminal resistor
20A, 20B: Optical modulation element 21: Sapphire substrate
22a, 22b: Optical waveguide
23: Buffer layer
24a, $24a_1$, $24a_2$: Signal electrode
24b: Ground electrode
200: Driver circuit
300: Terminator
$D_0$: Electrode isolation region
$D_{1a}$, $D_{1b}$: Nearby region
MZ: Interaction part
$MZ_1$: First interaction part
$MZ_2$: Second interaction part
$MZ_3$: Third interaction part
$MZ_4$: Fourth interaction part
NZ: Nearby region of interaction part

What is claimed is:

1. An optical modulation element comprising:
a substrate; and
at least one interaction part provided on the substrate, wherein
the interaction part includes first and second optical waveguides formed adjacent to each other on the substrate and first and second signal electrodes provided so as to oppose the first and second optical waveguides respectively and to which differential signals are applied,
no ground electrode is provided in a nearby region of the interaction part,
a ground electrode is provided in a vicinity of at least one of an input part and a terminal part electrically connected to each of the first and second signal electrodes,
the input part has a first signal electrode pad electrically connected to one end of the first signal electrode and a second signal electrode pad electrically connected to one end of the second signal electrode,
the ground electrode includes a first ground electrode pad adjacent to the first signal electrode pad and a second ground electrode pad adjacent to the second signal electrode pad, and
the first and second ground electrode pads are electrically connected to each other through a first short-circuit pattern provided on the substrate.

2. The optical modulation element according to claim 1, wherein
the first and second ground electrode pads are electrically connected through a ground line in a driver circuit that applies the differential signals to the first and second signal electrode pads.

3. The optical modulation element according to claim 1, wherein
the terminal part has a first terminal electrode pad electrically connected to another end of the first signal electrode and a second terminal electrode pad electrically connected to another end of the second signal electrode, and
the ground electrode includes a third ground electrode pad adjacent to the first terminal electrode pad and a fourth ground electrode pad adjacent to the second terminal electrode pad.

4. The optical modulation element according to claim 3, wherein
the third and fourth ground electrode pads are electrically connected to each other through a second short-circuit pattern formed on the substrate.

5. The optical modulation element according to claim 3, wherein
the another end of the first signal electrode is drawn to a vicinity of an edge of the substrate through a third lead-out part,
the another end of the second signal electrode is drawn to the vicinity of the edge of the substrate through a fourth lead-out part,
the first terminal electrode pad is connected to the third lead-out part, and
the second terminal electrode pad is connected to the fourth lead-out part.

6. The optical modulation element according to claim 3, wherein
a second short-circuit pattern is provided in a same electrode layer as that of the third and fourth ground electrode pads.

7. The optical modulation element according to claim 1, wherein
the nearby region of the interaction part is a region within a range of five times or less an interval between the first and second optical waveguides from the center of the interaction part.

8. The optical modulation element according to claim 1, wherein
the substrate is a single crystal substrate, and
the first and second optical waveguides are formed of a lithium niobate film formed in a ridge shape on the substrate.

9. The optical modulation element according to claim 1, wherein
the interaction part includes:
a waveguide layer including the first and second optical waveguides and formed on a main surface of the substrate;
a buffer layer formed on at least upper surfaces of the respective first and second optical waveguides; and
an electrode layer including the first and second signal electrodes and formed on an upper surface of the buffer layer, and
the first and second signal electrodes are opposite to the respective first and second optical waveguides through the buffer layer.

10. The optical modulation element according to claim 1, wherein
the one end of the first signal electrode is drawn to a vicinity of an edge of the substrate through a first lead-out part,
the one end of the second signal electrode is drawn to the vicinity of the edge of the substrate through a second lead-out part,
the first signal electrode pad is connected to the first lead-out part, and
the second signal electrode pad is connected to the second lead-out part.

11. The optical modulation element according to claim 10, wherein
the first ground electrode pad, the second ground electrode pad, and the first short-circuit pattern are arranged on the edge of the substrate,
the first signal electrode pad and the second signal electrode pad are arranged on an inner side of the substrate than the first short-circuit pattern.

12. The optical modulation element according to claim 10, wherein
the ground electrode includes a third ground electrode pad and a fourth ground electrode pad, the third ground electrode pad, the fourth ground electrode pad and a second short-circuit pattern are arranged on the edge of the substrate, and a first terminal electrode pad and a second terminal electrode pad are arranged on an inner side of the substrate than the second short-circuit pattern.

13. The optical modulation element according to claim 1, wherein the first short-circuit pattern is provided in a same electrode layer as that of the first and second ground electrode pads.

14. An optical modulation element comprising:

a substrate; and at least one interaction part provided on the substrate, wherein the interaction part includes first and second optical waveguides formed adjacent to each other on the substrate and first and second signal electrodes provided so as to oppose the first and second optical waveguides respectively and to which differential signals are applied, no ground electrode is provided in a nearby region of the interaction part, a ground electrode is provided in a vicinity of at least one of an input part and a terminal part electrically connected to each of the first and second signal electrodes, the terminal part has a first terminal electrode pad electrically connected to another end of the first signal electrode and a second terminal electrode pad electrically connected to another end of the second signal electrode, the ground electrode includes a third ground electrode pad adjacent to the first terminal electrode pad and a fourth ground electrode pad adjacent to the second terminal electrode pad, and the third and fourth ground electrode pads are electrically connected to each other through a second short-circuit pattern provided on the substrate.

15. The optical modulation element according to claim 14, wherein the nearby region of the interaction part is a region within a range of five times or less an interval between the first and second optical waveguides from the center of the interaction part.

16. The optical modulation element according to claim 14, wherein the substrate is a single crystal substrate, and the first and second optical waveguides are formed of a lithium niobate film formed in a ridge shape on the substrate.

17. The optical modulation element according to claim 14, wherein the interaction part includes:

a waveguide layer including the first and second optical waveguides and formed on a main surface of the substrate;

a buffer layer formed on at least upper surfaces of the respective first and second optical waveguides; and an electrode layer including the first and second signal electrodes and formed on an upper surface of the buffer layer, and the first and second signal electrodes are opposite to the respective first and second optical waveguides through the buffer layer.

18. The optical modulation element according to claim 14, wherein the another end of the first signal electrode is drawn to a vicinity of an edge of the substrate through a third lead-out part, the another end of the second signal electrode is drawn to the vicinity of the edge of the substrate through a fourth lead-out part, the first terminal electrode pad is connected to the third lead-out part, and the second terminal electrode pad is connected to the fourth lead-out part.

19. The optical modulation element according to claim 18, wherein the third ground electrode pad, the fourth ground electrode pad and the second short-circuit pattern are arranged on the edge of the substrate, and the first terminal electrode pad and the second terminal electrode pad are arranged on an inner side of the substrate than the second short-circuit pattern.

20. The optical modulation element according to claim 14, wherein the second short-circuit pattern is provided in a same electrode layer as that of the third and fourth ground electrode pads.

21. An optical modulation element comprising:

a substrate; and at least one interaction part provided on the substrate, wherein the interaction part includes first and second optical waveguides formed adjacent to each other on the substrate and first and second signal electrodes provided so as to oppose the first and second optical waveguides respectively and to which differential signals are applied, no ground electrode is provided in a nearby region of the interaction part, a ground electrode is provided in the vicinity of at least one of an input part and a terminal part electrically connected to each of the first and second signal electrodes, the input part has a first signal electrode pad electrically connected to one end of the first signal electrode; and a second signal electrode pad electrically connected to one end of the second signal electrode, the terminal part has a first terminal electrode pad electrically connected to another end of the first signal electrode; and a second terminal electrode pad electrically connected to another end of the second signal electrode, the ground electrode includes:

a first ground electrode pad adjacent to the first signal electrode pad;

a second ground electrode pad adjacent to the second signal electrode pad;

a third ground electrode pad adjacent to the first terminal electrode pad; and a fourth ground electrode pad adjacent to the second terminal electrode pad, the third ground electrode pad is connected to the first ground electrode pad through a third short-circuit pattern provided on the substrate, and the fourth ground electrode pad is connected to the second ground electrode through a fourth short-circuit pattern provided on the substrate.

22. The optical modulation element according to claim 14, wherein the nearby region of the interaction part is a region within a range of five times or less an interval between the first and second optical waveguides from the center of the interaction part.

23. The optical modulation element according to claim 14, wherein
the substrate is a single crystal substrate, and
the first and second optical waveguides are formed of a lithium niobate film formed in a ridge shape on the substrate.

24. The optical modulation element according to claim 14, wherein
the interaction part includes:
a waveguide layer including the first and second optical waveguides and formed on a main surface of the substrate;
a buffer layer formed on at least upper surfaces of the respective first and second optical waveguides; and
an electrode layer including the first and second signal electrodes and formed on an upper surface of the buffer layer, and
the first and second signal electrodes are opposite to the respective first and second optical waveguides through the buffer layer.

25. The optical modulation element according to claim 14, wherein
third and fourth short-circuit patterns are provided in a same electrode layer as that of the first to fourth ground electrode pads.

26. The optical modulation element according to claim 22, wherein
a third short-circuit pattern is provided so as to surround the interaction part, and
a fourth short-circuit pattern is provided along an edge of the substrate.

27. The optical modulation element according to claim 21, wherein
the one end of the first signal electrode is drawn to a vicinity of an edge of the substrate through a first lead-out part,
the one end of the second signal electrode is drawn to the vicinity of the edge of the substrate through a second lead-out part,
the another end of the first signal electrode is drawn to the vicinity of the edge of the substrate through a third lead-out part,
the another end of the second signal electrode is drawn to the vicinity of the edge of the substrate through a fourth lead-out part,
the first signal electrode pad is connected to the first lead-out part,
the second signal electrode pad is connected to the second lead-out part,
the first terminal electrode pad is connected to the third lead-out part, and
the second terminal electrode pad is connected to the fourth lead-out part.

28. The optical modulation element according to claim 21, wherein
the first and second signal electrode pads, the first and second terminal electrode pads, and the first to fourth ground electrode pads are arranged on the edge of the substrate.

* * * * *